United States Patent [19]

Schott

[11] Patent Number: 4,552,291

[45] Date of Patent: Nov. 12, 1985

[54] APPARATUS FOR BREAKING RAILROAD RAILS

[76] Inventor: Jeffery L. Schott, 1142 Featherstone Rd., Box 20, Red Wing, Minn. 55066

[21] Appl. No.: 519,309

[22] Filed: Aug. 1, 1983

[51] Int. Cl.[4] .............................................. B23P 17/02
[52] U.S. Cl. ..................................... 225/96.5; 225/2; 225/103
[58] Field of Search ..................... 225/96.5, 103, 2; 104/7 R, 7 A, 7 B; 83/928

[56] References Cited

U.S. PATENT DOCUMENTS

| | | | |
|---|---|---|---|
| 1,284,312 | 11/1918 | Glover | 225/103 |
| 1,309,354 | 7/1919 | Dallmeyer et al. | 225/103 X |
| 2,334,940 | 11/1943 | Tourneau | 225/103 |
| 3,904,097 | 9/1975 | Grambo, Jr. et al. | 225/103 |
| 3,933,067 | 1/1976 | Clark | 83/928 X |
| 4,103,622 | 8/1978 | Theurer | 104/7 R |
| 4,105,150 | 8/1978 | Insolio | 225/96.5 |
| 4,346,828 | 8/1982 | Crawley | 225/103 X |
| 4,383,630 | 5/1983 | Solomon et al. | 225/103 |

FOREIGN PATENT DOCUMENTS 602320 4/1978 U.S.S.R. ............................ 225/96.5
622592 9/1978 U.S.S.R. ............................ 225/96.5

Primary Examiner—Frank T. Yost
Attorney, Agent, or Firm—Herman H. Bains; Malcolm L. Moore; Conrad A. Hansen

[57] ABSTRACT

A process and apparatus for breaking railroad rails into small pieces of predetermined length includes a trailer having an infeed conveyor mounted on the bed thereof. A rail breaker device is mounted on the trailer bed adjacent the discharge end of the infeed conveyor, and a stop member is positioned downstream of the discharge end of the infeed conveyor and in obstructing relation with respect to rails moved by the infeed conveyor. The rail breaker device includes a hydraulically operated clamping and scoring member which is operable to clamp the end of the rail against the anvil plate, and to simultaneously score and cut the rail. An hydraulically operated impact member is positioned between the clamping and scoring member and the stop member, and is operable to break the rail along the score line whereby rails moved by the infeed conveyor may be continuously broken into pieces of predetermined length.

10 Claims, 7 Drawing Figures

APPARATUS FOR BREAKING RAILROAD RAILS

SUMMARY OF THE INVENTION

This invention relates to a method and apparatus for breaking railroad rails into pieces of predetermined length.

Rails from abandoned railroad lines and from damaged and worn sections of active railroad lines are removed and used as scrap metal. However, these elongate rails must be cut or broken into sizes that can be used in furnaces that melt the scrap metal. Typically, the rails are removed from the railroad line and are then transported to a foundry where the rails are cut or broken into the desired lengths. In some operations, the rails are partially cut with a torch and then several such rails are arranged in side-by-side relation. A crane then drops a heavy weight on the partially cut rails to break the rails. There are also prior art devices which shear the rails with a shear device to cut the rails into the desired length. It has been found that the reaction forces produced in the shearing action often times results in damage to the shear device. Further, none of these prior art devices is portable and therefore cannot be transported to rail removal sites.

It is therefore an object of this invention to provide a novel portable rail breaking apparatus, of simple and inexpensive construction and operation, which may be readily transported to rail removal sites where the rails are broken into pieces of predetermined desired length for easy transport and ready use in a furnace.

Another object of this invention is to provide a novel method and apparatus for breaking rails wherein the rails to be broken and advanced in predetermined increments of movement, and are then clamped and scored after movement is interrupted, and are thereafter impacted by an impacting medium to continuously break the rails into predetermined lengths.

These and other objects and advantages of my invention will appear more fully from the following description made in conjunction with the accompanying drawings wherein like reference characters refer to the same or similar parts throughout the several views.

FIGURES OF THE DRAWING

DESCRIPTION OF THE PREFERRED EMBODIMENT

Figure 1:
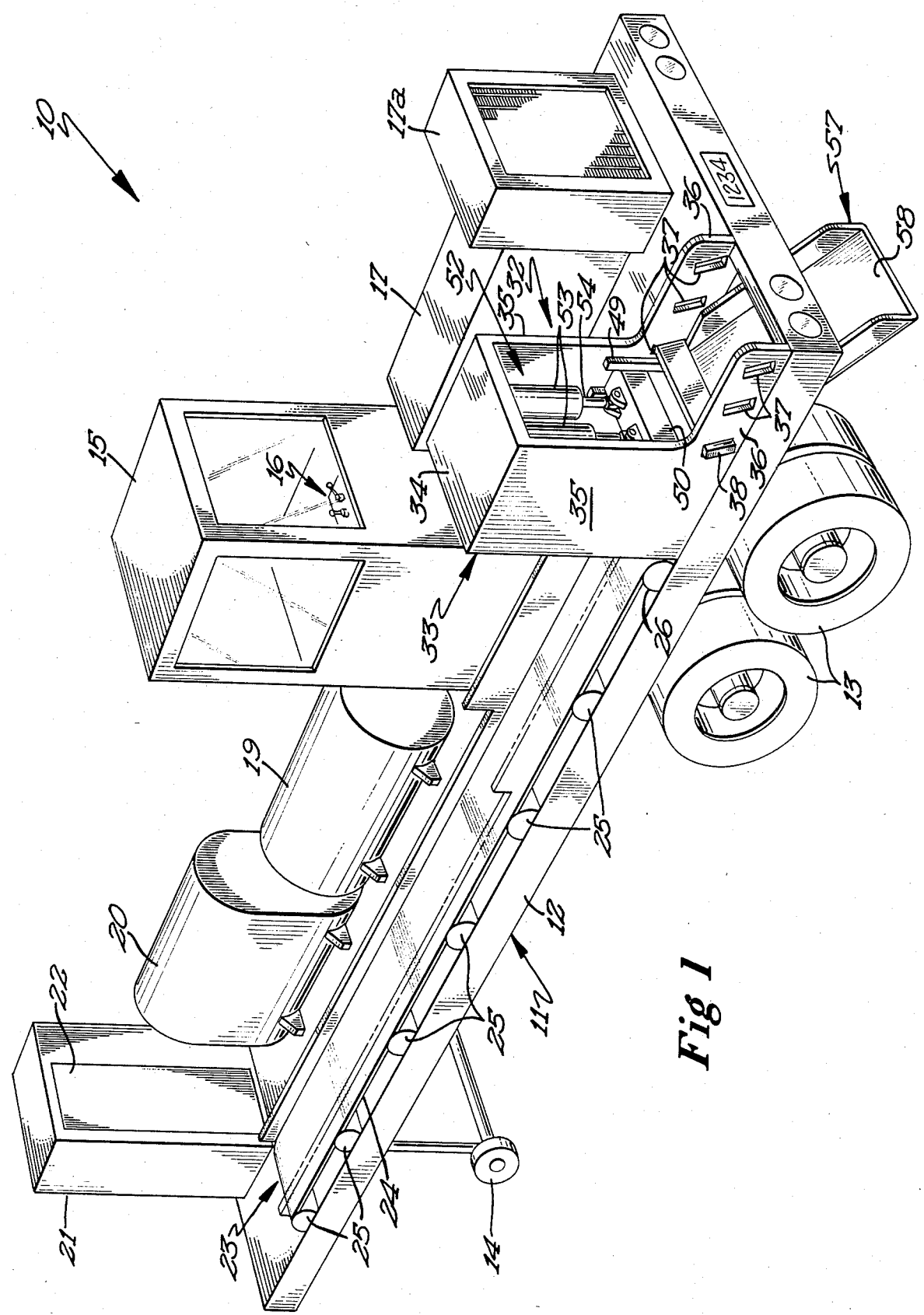
FIG. 1 is a perspective view of the novel rail breaking apparatus.
Figure 2:
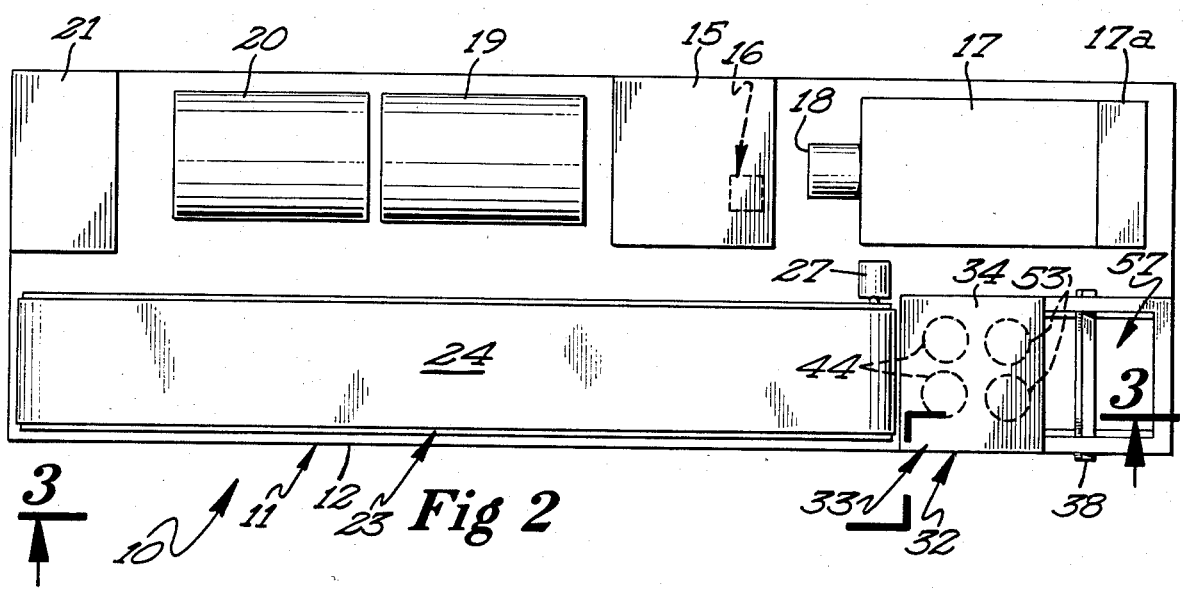
FIG. 2 is a top plan view of the apparatus.

Referring now to the drawings, and more particularly to FIGS. 1 and 2, it will be seen that one embodiment of the novel portable rail breaking apparatus, designated by the reference numeral 10, is thereshown. The rail breaking apparatus 10 includes a trailer 11 which is adapted to be towed by a prime mover such as a tractor or the like. The trailer 11 is of conventional construction and includes an elongate, flat, generally rectangular bed 12 mounted on a chassis (not shown) having pairs of ground-engaging wheels 13 located at the rear end thereof to support the trailer for travel along a road surface. The trailer is provided with a fifth wheel for connection to a conventional tractor and is also provided with a dolly wheel assembly 14 for supporting the front end portion of the trailer when the trailer is disconnected from the tractor.

Figure 7:
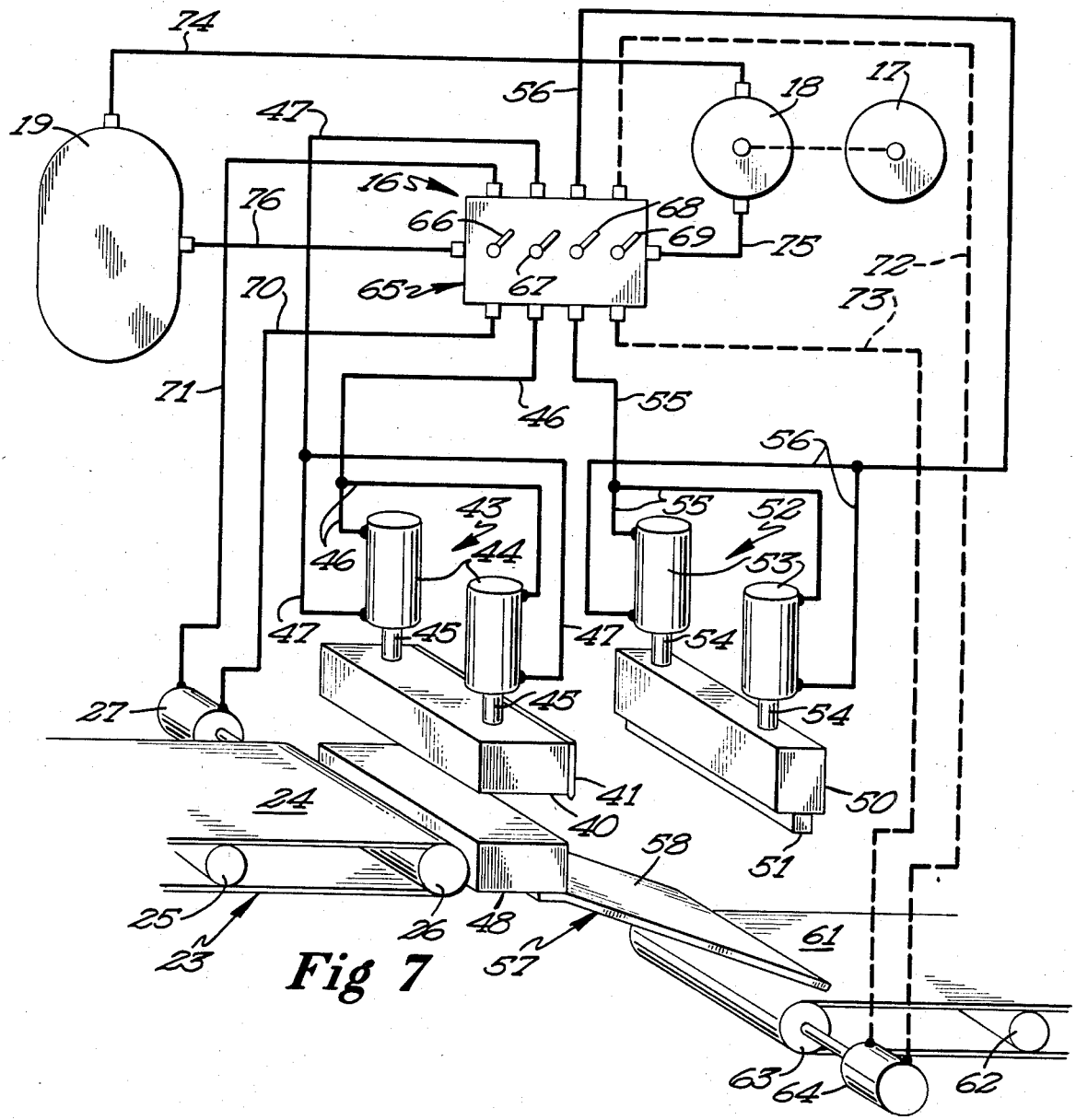
FIG. 7 is a schematic diagram of the hydraulic system used to operate the various components of the apparatus.

The rail breaking apparatus 10 also includes an operator's cab 15 which is mounted on the trailer intermediate the ends thereof, and adjacent one side of the trailer. The operator's cab is provided with the controls 16 for actuating the hydraulic system used to operate the various components of the rail breaking apparatus. An internal combustion engine 17 of conventional construction is mounted on the trailer and operates a hydraulic pump 18, as best seen in FIGS. 2 and 7. The engine 17 may be either a gasoline or diesel engine, and is provided with a radiator-type heat exchanger 17a for cooling the hydraulic fluid used in the hydraulic system. In the embodiment shown, two such heat exchangers are provided for cooling the volume of hydraulic fluid used in the present apparatus.

The hydraulic fluid used in the hydraulic system is stored in a reservoir 19 which is mounted on the trailer bed 12 adjacent one side thereof. A fuel tank 20 containing fuel for the engine 17 is also mounted on the trailer bed and is adapted to contain a sufficient amount of fuel for operating the engine 17 over a predetermined period of time. A storage structure 21 having access doors 22 is mounted adjacent one end of the trailer bed 12, and contains spare parts and extra components for the system.

Figure 6:
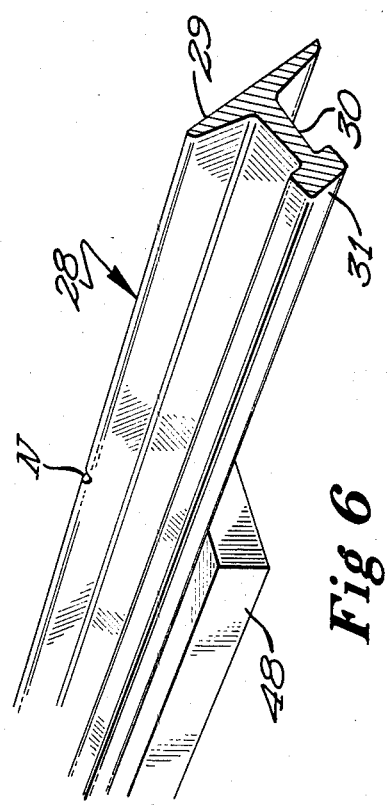
FIG. 6 is a fragmentary perspective view of a rail which has been cut and scored by the clamping and scoring mechanism.

The rail breaking apparatus includes an elongate infeed conveyor 23 which is comprised of an elongate endless apron or belt 24 trained about a plurality of idler rollers 25 and about a driven roller 26. The driven roller is driven by a reversible rotary hydraulic motor 27. It will be noted that the infeed conveyor 23 is mounted on the trailer bed 12 adjacent one side thereof, and extends over a major portion of the length of the trailer bed. In this regard, the infeed conveyor 23 is adapted to support and move rails 28 in a predetermined path of travel. The rails 28 are conventional railroad rails, and include a lower flange 29, a central web 30 and an upper flange 31, as best seen in FIG. 6. The rails are of predetermined length and weight, and must be cut or broken into smaller pieces for use in recycling the metal for commercial use.

Figure 3:
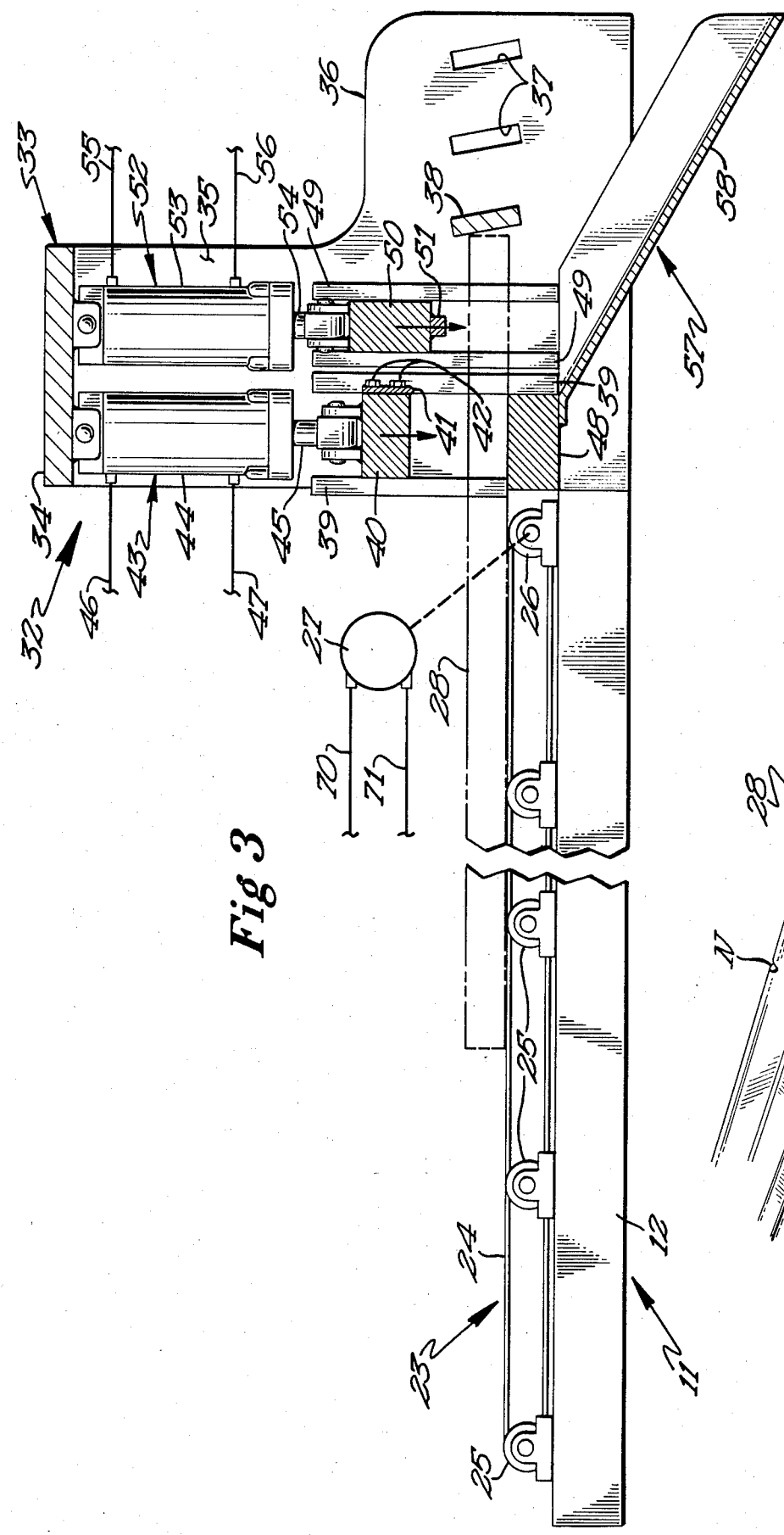
FIG. 3 is a side view, partly in section and partly in elevation, taken approximately along line 3—3 of FIG. 2 and looking in the direction of the arrows.
Figure 4:
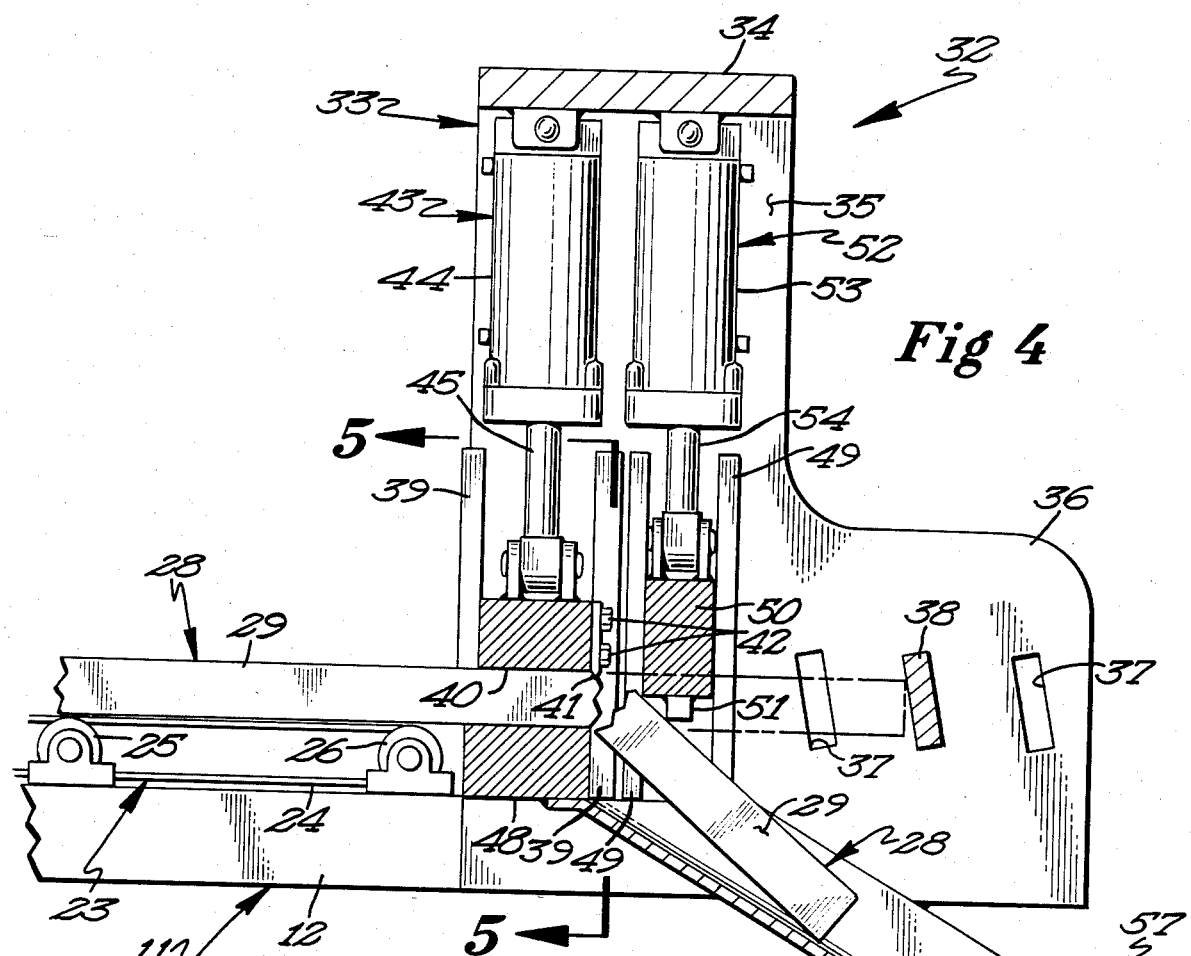
FIG. 4 is a cross-sectional view similar to FIG. 2, but on an enlarged scale illustrating the apparatus in a rail breaking mode.

The rail breaking apparatus 10 also includes a rail breaker device 32 which is mounted adjacent the rear end of the trailer bed 12. The rail breaker device 32 includes a housing or support frame 33 which is comprised of an upper frame member 34 and opposed, substantially parallel side frame members 35 integral with the upper frame member 34. The lower edges of the side frame members 35 engage the upper surface of the trailer bed 12. Referring now to FIGS. 1, 3 and 4, it will be seen that the side frame members are each provided with rear extensions 36 which project rearwardly therefrom. It will be noted that the vertical dimension of the rear extensions is substantially less than the vertical dimension of the side frame members.

Referring again to FIGS. 1, 3 and 4, it will be seen that the rear extensions 36 of the side frame members 35 are provided with a plurality of longitudinally spaced apart, generally angularly arranged slots 37. Each slot 37 in one of the rear extensions is arranged in opposed relation to a slot in the other extension. An elongate, generally rectangular shaped, substantially flat bar 38 extends through a pair of the opposed slots 37, and this bar 38 serves as a stop for the rails to be broken. It is pointed out that the stop bar 38 may be positioned in any selected pair of slots 37. It will be noted that the stop bar 38 is positioned in obstructing relation with respect to a rail 28 supported on the upper run 24a of the conveyor belt 24. It will also be noted that the bar 38 is angled downwardly and rearwardly, and this angled relation minimizes the changes of the rail binding against the stop bar during the breaking operation.

Each side frame member 35 is provided with a pair of vertically disposed, longitudinally spaced apart, substantially parallel guide elements 39, one of which is positioned adjacent the front vertical edge of the associated frame member. An elongate, generally rectangular shaped, transversely extending clamping bar 40 has its end portions positioned between the guide elements 39 on the side frame members 35. The clamping bar 40 is vertically shiftable relative to the guide elements 39. Means are provided for shifting the clamping bar between clamping and released positions, and this means includes a pair of vertically disposed double-acting hydraulic rams 43. Each hydraulic ram 43 includes a vertically disposed cylinder 44 which has its upper end rigidly affixed to the upper frame member 34. Each cylinder 44 has a piston movable therein to which is connected a piston rod 45 that is extensible and retractable relative to the associated cylinder. Each cylinder also has a hydraulic line 46 and a hydraulic line 47 connected in communicating relation thereto. An elongate, generally rectangular shaped anvil plate 48 is positioned below and in opposed relation with respect to the clamping bar 40.

The rear edge of the clamping bar 40 has an elongate, generally rectangular shaped, transversely extending scoring blade 41 secured thereto by bolts 42. The lower edge of the scoring blade 41 defines a cutting edge that is adapted to score the flange 29 of a rail 28 when the clamping bar 40 is shifted into clamping relation by the hydraulic rams 43. It will be noted that the anvil plate 48 is positioned at approximately the same horizontal level as the infeed conveyor 23. With this arrangement, the upper surface of the anvil plate 48 is disposed in substantially co-planar relation with the upper run 24a of the endless conveyor belt 24. It will therefore be seen that when a rail 28 is moved by the infeed conveyor 23 so that the end of the rail engages the stop bar 38, a portion of the rail will be positioned upon the anvil plate 48. Thereafter, when the piston rods 45 are extended to move the clamping bar 40 to the clamping position, the blade 41 will score the flange 29 of the rail, and the rail will be clamped against the anvil plate 48 by the clamping bar 40.

Referring again to FIGS. 3 and 4, it will be seen that the side frame members 35 are each provided with a pair of longitudinally spaced apart, vertically disposed, parallel guide elements 49 which are located rearwardly of the associated pair of guide elements 39 for the clamping bar 40. An elongate, generally rectangular shaped impact member 50 has opposite end portions positioned between the guide elements 49 and is vertically movable relative to the guide elements. The impact member 50 is formed of hardened steel, and is provided with an elongate, rectangular shaped, transversely extending striking element 51 which is affixed to the lower surface of the impact member.

Means are provided for vertically shifting the impact member 50, and this means includes a pair of double-acting hydraulic rams 52 arranged in side-by-side relation and each including an elongate, vertically disposed cylinder 53. It will be seen that each cylinder 53 is rigidly affixed to the lower surface of the upper frame member 34. Each cylinder is provided with a piston movable therein, and the piston is connected to a piston rod 54 which projects from the associated cylinder. It will be seen that extension of the piston rods 54 shifts the impact member and striking element in a downward direction and, conversely, retraction of the piston rods moves the impact member 50 in an upward direction. It will also be seen that each cylinder 53 has one end of an elongate conduit 55 and one end of an elongate conduit 56 connected in communicating relation thereto.

The rail breaker device 32 is also provided with a discharge chute 57 located below the impact member 50. The chute 57 includes a substantially flat, downwardly and rearwardly inclined, lower plate 58 which extends between and is rigidly affixed to opposed vertical side plates 59. The discharge chute 57 is affixed to the trailer 11. The downward and rearward inclination of the discharge chute is such that when a piece of rail is broken by the impact member 50, the broken piece will drop on the discharge chute and thereafter slide from its lower end by action of gravity.

In the preferred embodiment, the rail breaking apparatus 10 may also be provided with an elongate discharge conveyor 60 which has one end thereof positioned below the discharge end of the discharge chute 57 so that broken rail pieces will fall upon the conveyor. The discharge conveyor 60 is substantially identical in construction to the infeed conveyor, and includes an elongate endless apron or belt 61 trained about a plurality of idler rollers 62 and also trained about a driven roller 63. A reversible hydraulic motor 64 is drivingly connected with the driven roller 63 so that broken rail pieces conveyed by the discharge conveyor will be delivered to a collection station.

A diagram of the hydraulic system for operating the various components of the rail breaking apparatus is diagrammatically illustrated in FIG. 7 of the drawings. In this regard, it will be seen that the control device 16 for operating the hydraulic system actually comprises a compound valve body 65 which includes four three-way valves. Each of the three-way valves has an actuating lever including the lever 66, lever 67, lever 68 and lever 69.

It will be seen that the actuating lever 66 controls operation of the valve for the reversible hydraulic motor 27 that operates the infeed conveyor 23. Conduits 70 and 71 interconnect the hydraulic motor 27 in communicating relation with the ports of the valve in the control valve body 65 which operates hydraulic motor 27. It will also be seen that the conduits 46 and 47 are connected to the valve ports in the valve body 65 for operating the hydraulic rams 43. The actuating lever 67 may be shifted to retract the piston rods 45, extend the piston rods 45 or to a neutral position.

The actuating lever 68 controls operation of the double-acting hydraulic rams 52 for the impact member 50. It will therefore be seen that the conduits 55 and 56 are connected to the ports of the valve in the valve body 65 which controls the hydraulic rams 52. Finally, the actuating lever 69 controls operation of the reversible hydraulic motor 64 for the discharge conveyor 60. Conduits 72 and 73 are interconnected in communicating relation with the ports of the valve in the valve body 65 for controlling operation of the reversible hydraulic motor 64.

Again it will be noted that the lever 69 may be shifted between a forward direction, a reverse direction, or may be shifted to an off position. Similarly, the actuating lever 68 may be shifted between a retract position, an extension position or a neutral position for the hydraulic rams 52.

Hydraulic fluid from the reservoir 19 passes through a conduit 74 into the suction side of the pump 18. Hydraulic fluid under pressure passes through the discharge outlet of the pump 18, through the conduit 75 to the valve body 65. Fluid is returned from the valve body to the reservoir through a conduit 76.

When the rail breaking apparatus is used to break railroad rails, the apparatus will be towed to a removal site where the rails are removed from the railroad line. The rails will be of predetermined length, depending on the size used in the particular railroad line. Ordinarily, two people are required to operate the rail breaking apparatus. One person will operate the controls 16 in the cab 15 and the other person will operate a loader vehicle for loading rails to be broken on the infeed conveyor 23. The loader vehicle may be any commercial front end type loader, or fork lift truck vehicle, for placing the rails on the infeed conveyor.

Normally, four rails will be placed on the infeed conveyor in side-by-side relation, and these rails will be moved by the upper run 24a of the endless belt 24 to the rail breaker device 32. The ends of the four rails will be moved against the stop bar 38 and the operator will then shift the lever 66 to an off or neutral position. The lever 67 will then be shifted from a retracted position to an extension position to cause the piston rods for the hydraulic rams 43 to be extended and move the clamping bar 40 downwardly against the rails.

Figure 5:
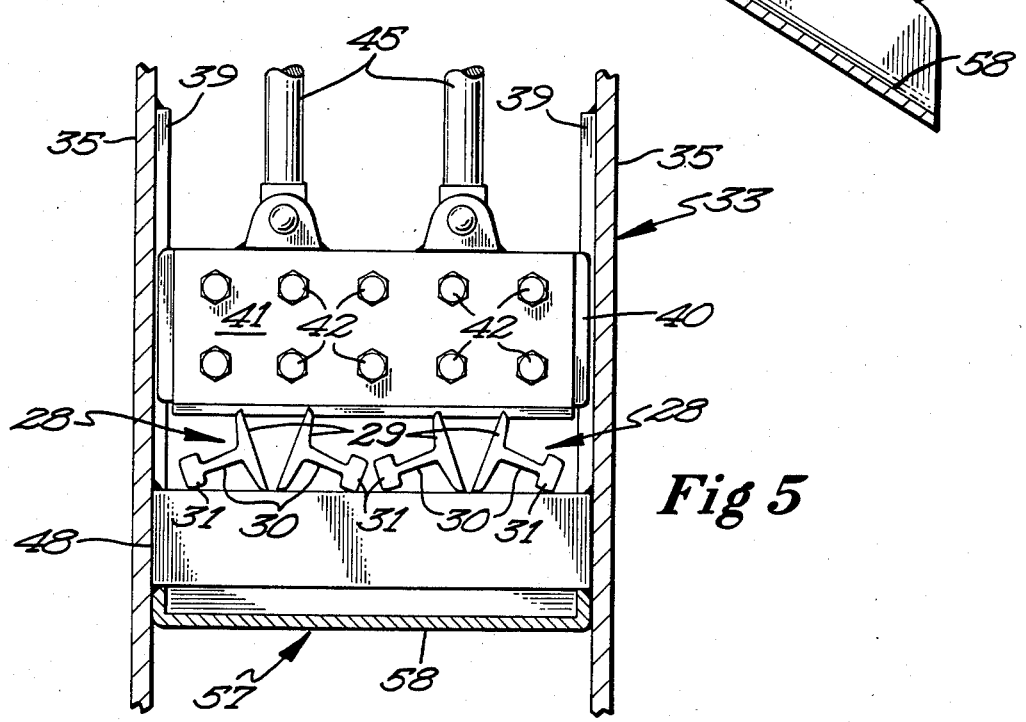
FIG. 5 is a cross-sectional view taken approximately along line 5—5 of FIG. 4 and looking in the direction of the arrows.

It will be noted that when the rails to be broken are loaded on the infeed conveyor, the rails will be laying on the respective sides thereof, as best seen in FIG. 5. When the clamping bar 40 moves downwardly into clamping relation with the rails, the scoring blade 41 will score or cut the flange 29 of each rail. A rail so scored is illustrated in FIG. 6. The score line lies in a plane extending transversely of the rail. The operator will then shift the lever 68 from a retract position to an extension position to thereby actuate the hydraulic rams 52 to thereby cause the piston rods 54 thereof to be extended. The element member 50 will be moved downwardly so that the striker element will engage the rails and cause the same to be broken along the score line. The pieces of rail so broken will move downwardly along and from the discharge chute 57 and upon the discharge conveyor 60 where the broken rail pieces will be moved to a collection station. The operator will then actuate the levers 67 and 68 to retract the piston rods for the hydraulic rams, and the hydraulic motor for the infeed conveyor will again move the rails until the ends thereof again strike the stop bar 38. This operation will continue until the rails are completely broken into pieces of predetermined length.

It will be seen that the stop bar 38 may be selectively positioned in any one of the pairs of openings 37 to vary the size of the broken pieces. This is important to accommodate different furnaces at foundries.

It will be seen that the rail breaking apparatus and method are continuous and require only two people to perform this continuous rail breaking operation. The portability of the apparatus permits it to be readily towed to rail removal sites so that the rails may be broken at the removal site. This is a distinct advantage in handling and transporting scrap rails to the foundry for recycling. Rails which have been broken can be handled and transported more inexpensively than full-size rails.

From the foregoing description, it will be seen that I have provided a novel rail breaking method and apparatus which is not only of simple and inexpensive construction, but one which functions in a more efficient manner than any heretofore known comparable system.

While the preferred embodiments of the present invention have been described, it should be understood that various changes, adaptions and modifications may be made therein without departing from the spirit of the invention and the scope of the appended claims.

What is claimed is:

1. A portable apparatus for breaking elongate railway rails into predetermined lengths for use as scrap metal, comprising:

a trailer having a bed and having ground-engaging wheels and adapted to be towed to an operational site by a prime mover, an elongate infeed conveyor on said trailer bed and having an infeed end and a discharge end for moving a plurality of rails to be broken in side by side relation towards the discharge end thereof, a rail breaker device mounted on said trailer bed and adjacent the discharge end of said infeed conveyor and including a support frame, a stop member mounted on said support frame in longitudinally spaced relation with respect to the discharge end of the infeed conveyor and being disposed in obstructing relation with respect to rails moved by said infeed conveyor whereby an end of each rail moved by the infeed conveyor will engage the stop member, an anvil plate mounted on said support frame between said stop member and the discharge end of the infeed conveyor, a vertically shiftable clamping and scoring member disposed in opposed relation with respect to said anvil plate and being vertically translatable towards and away from said anvil member, first power means connected to said clamping and scoring member and mounted on said support frame for shifting said clamping and scoring member towards and away from said anvil plate, said clamping and scoring member when shifted toward said anvil plate clamping said rail against the anvil plate and scoring the rail to be broken along a line extending transversely of the rail, a vertically shiftable impact member disposed between said clamping and scoring member and said stop member and vertically translatable in a forward and return direction, second power means connected to said impact member and mounted on said support frame adjacent said first power means for shifting said impact member in forward and return directions, said impact member when shifted in a forward direction simultaneously striking the rails clamped by said clamping and scoring member and breaking said rails along the scored transverse lines.

2. The apparatus as defined in claim 1 and vertical guide means on said support frame engaged by said clamping and scoring member for guiding the latter in its vertical movement, said power means for said clamping and scoring member comprising a hydraulic ram means.

3. The apparatus as defined in claim 1 and vertical guide means on said support frame engaged by said impact means for guiding the latter in its vertical movement in forward and return directions, said power means for said impact means comprising hydraulic ram means.

4. The apparatus as defined in claim 1 wherein said stop member is adjustably mounted on said support frame to permit adjustment in the length of broken pieces of rail.

5. The apparatus as defined in claim 1 and a discharge conveyor positioned adjacent said rail breaker device receiving broken pieces of rail from the latter and conveying said rail pieces away from the point of reception.

6. The apparatus as defined in claim 1 wherein said clamping and scoring member comprises a clamping bar, a blade affixed to said bar and projecting therefrom and adapted to form a notch in a plurality of rails when said clamping and scoring member is shifted towards the anvil plate.

7. A portable apparatus for breaking elongate railway rails into predetermined lengths for use as scrap metal, comprising:

a trailer having a bed and having ground-engaging wheels and adapted to be towed to an operational site, an elongate horizontal infeed conveyor on said trailer bed and having an infeed end and a discharge end for supporting and moving a plurality of rails in side-by-side relation thereon towards the discharge end, drive means operatively connected to said conveyor for driving the same in a direction for moving the rails toward the discharge end, a rail breaker device mounted on said trailer bed adjacent the discharge end of said infeed conveyor and including a support frame, a stop member mounted on said support frame in longitudinally spaced relation with respect to the discharge end of the infeed conveyor and being disposed in obstructing relation to rails moved by said infeed conveyor whereby the ends of a plurality of rails moved by the infeed conveyor will engage the stop member, a generally horizontally disposed anvil plate mounted on said support frame between said stop member and the discharge end of the conveyor, first vertical guide means on said support frame, a vertically shiftable, horizontal clamping member disposed in opposed relation with respect to said anvil plate and being vertically translatable towards and away from said anvil plate in a direction substantially normal to the direction of movement of the rails, said clamping member engaging said guide means and being guided thereby during vertical translation of said clamping member, first vertically disposed power means connected to said clamping member and mounted on said support frame for vertically shifting said clamping member toward and away from said anvil plate, said clamping member when shifted towards said anvil plate clamping said rails against the anvil plate, second vertical guide means on said support frame, a vertically shiftable impact member disposed between said clamping member and said stop member and vertically translatable between upper and lower positions, said impact member engaging said second vertical guide means during vertical movement of said impact member, second vertically disposed power means connected to said impact member and mounted on said support frame adjacent said first power means for vertically shifting said impact member between upper and lower positions, said impact member when shifted downwardly toward said lower position simultaneously striking and breaking a plurality of rails clamped by said clamping member.

8. The apparatus as defined in claim 7 and a discharge chute mounted on said support frame and inclined downardly from adjacent said anvil plate.

9. An apparatus for simutlaneously breaking a plurality of elongate railway rails into predetermined lengths for use as scrap metal, comprising:

an elongate, horizontal infeed conveyor having an infeed end and having a discharge end for supporting and moving a plurality of rails in side-by-side relation thereon toward the discharge end thereof, drive means operatively connected with said conveyor for driving the same ina direction for moving the rails towards the discharge end, a rail breaker device positioned adjacent the discharge end of said infeed conveyor and including a support frame, a stop member mounted on said support frame in longitudinally spaced relation with respect to the discharge end of the infeed conveyor and being disposed in obstructing relation with respect to rails moved by said infeed conveyor whereby the ends of a plurality of rails moved by the infeed conveyor will engage the stop member, a horizontally disposed anvil plate mounted on said support frame between said stop member and the discharge end of the infeed conveyor, a vertically shiftable clamping member disposed in opposed relation with respect to said anvil plate and being vertically translatable towards and away from said anvil plate in a direction substantially normal to the direction of movement of the rails, first vertically disposed power means connected with said clamping member and mounted on said support frame for vertically shifting said clamping member towards and away from said anvil plate, said clamping member when shifted toward said anvil plate clamping said rails against the anvil plate, first vertical guide means on said support frame engaging said clamping member for guiding the latter during vertical translation thereof, a vertically shiftable impact member disposed between said clamping member and said stop member and being vertically translatable between raised and lowered positions, second vertical guide means on said support frame engaged by said impact member and guiding the latter during vertical translation thereof, second vertically disposed power means connected to said impact member and mounted on said support frame adjacent said first power means for vertically shifting said impact member between raised and lowered positions, said impact member when shifted to a lowered position striking a plurality of rails clamped by said clamping member and simultaneously breaking said rails, and a discharge chute on said support extending downwardly at an incline from said anvil plate and below said stop member.

10. An apparatus for simultaneously breaking a plurality of elongate railway rails into predetermined lengths for use as scrap metal, comprising:

an elongate, horizontal infeed conveyor having an infeed end and having a discharge end for supporting and moving a plurality of rails in side-by-side relation thereon toward the discharge end thereof, a rail breaker device positioned adjacent the discharge end of said infeed conveyor and including a support frame, a stop member mounted on said support frame in longitudinally spaced relation with respect to the discharge end of the infeed conveyor and being disposed in obstructing relation with respect to rails moved by said infeed conveyor whereby the ends of a plurality of rails moved by the infeed conveyor will engage the stop member, a horizontally disposed anvil plate mounted on said support frame between said stop member and the discharge end of the infeed conveyor, a vertically shiftable clamping member disposed in opposed relation with respect to said anvil plate and being vertically translatable towards and away from said anvil plate, a scoring blade mounted on said clamping member and being movable therewith, said scoring blade simultaneously forming a notch in each of said rails when the clamping member is shifted towards said anvil plate, first power means connected with said clamping member and mounted on said support frame for vertically shifting said clamping member towards and away from said anvil plate, said clamping member when shifted toward said anvil plate clamping said rails against the anvil plate, first vertical guide means on said support frame engaging said clamping member for guiding the latter during vertical translation thereof, a vertically shiftable impact member disposed between said clamping member and said stop member and being vertically translatable between raised and lowered positions, second vertical guide means on said support frame engaged by said impact member and guiding the latter during vertical translation thereof, second power means connected to said impact member and mounted on said support frame adjacent said first power means for vertically shifting said impact member between raised and lowered positions, said impact member when shifted to a lowered position striking a plurality of rails clamped by said clamping member and simultaneously breaking said rails, and a discharge chute on said support extending downwardly at an incline from said anvil plate and below said stop member.

* * * * *